Figure 1:
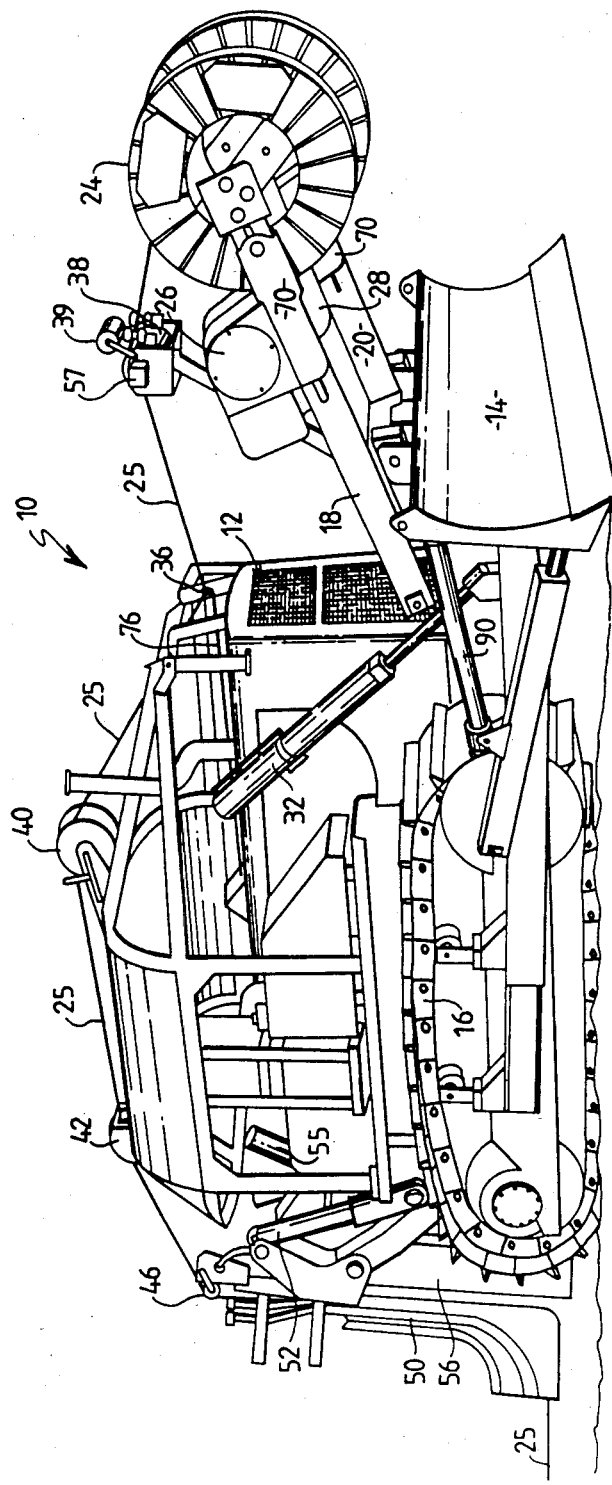

United States Patent [19]

Vidler

[11] Patent Number: 4,744,696
[45] Date of Patent: May 17, 1988

[54] CABLE LAYING APPARATUS

[75] Inventor: Ross A. Vidler, Queensland, Australia

[73] Assignee: Australian Telecommunications Commission, Melbourne, Australia

[21] Appl. No.: 905,998

[22] Filed: Sep. 11, 1986

Related U.S. Application Data

[63] Continuation-in-part of Ser. No. 778,453, Sep. 20, 1985.

[30] Foreign Application Priority Data

Sep. 21, 1984 [AU] Australia ............... PG7266/84

[51] Int. Cl.⁴ .................... E02F 5/10; F16L 1/02
[52] U.S. Cl. .................... 405/180; 242/86.5 R; 405/174; 405/175; 405/177
[58] Field of Search ............ 405/174, 175, 177, 180; 254/273, 86.51, 86.5 R, 75.51

[56] References Cited

U.S. PATENT DOCUMENTS

| | | | |
|---|---|---|---|
| 1,850,412 | 3/1932 | Pavlik | 405/175 |
| 3,788,575 | 1/1974 | Boettcher et al. | 405/177 |
| 3,926,263 | 12/1975 | Frisbee et al. | 405/177 |
| 4,038,828 | 8/1977 | Schuck et al. | 405/177 |
| 4,318,638 | 3/1982 | Promersberger et al. | 405/177 |
| 4,397,585 | 8/1983 | Fouss et al. | 405/174 |
| 4,437,789 | 3/1984 | Kasiewicz | 405/174 |
| 4,629,363 | 12/1986 | Rose et al. | 405/180 |

*Primary Examiner*—Dennis L. Taylor
*Attorney, Agent, or Firm*—Sughrue, Mion, Zinn, Macpeak & Seas

[57] ABSTRACT

Optical fibre cable laying apparatus comprising a mobile carrier for paying out cable from a reel and laying the cable in a trench formed by a tyne on the carrier. The reel is rotated, to effect paying out, in a fashion such as to control the tension in the cable. A slack loop is formed in the cable during paying out and the amount of cable in that slack loop is monitored. When the amount of cable in the slack loop decreases, the rate of paying out is increased, and when there is a greater amount of cable in the slack loop, the rate of paying out is decreased. Tension rollers are employed to further minimize tension in the cable as laid.

7 Claims, 2 Drawing Sheets

CABLE LAYING APPARATUS

This is a continuation-in-part application of Ser. No. 778,453, filed Sept. 20, 1985.

This invention relates to cable laying apparatus. Cable laying apparatus in which cable is, for example, payed out from a reel and layed or buried behind the apparatus as it moves over a ground surface is known. Such apparatus may include trench forming means, such as a downwardly projecting tyne, which is effective to form a trench in the ground surface as the apparatus moves thereover, the apparatus being arranged for the laying of the payed out cable in the trench.

For laying cables of substantial tensile strength, such as conventional telecommunications cables, the cable may simply be payed out from a freely rotatable reel positioned at a forward end of the apparatus so as to pass over the apparatus and to be laid in the trench behind the apparatus as it moves. In such a case, the frictional resistance to movement presented by already laid cable in the trench provides a holding force which is effective to rotate the cable reel as the apparatus moves over the ground surface. Where, however, the cable is more susceptible to damage by imposition of the tensile forces which are naturally generated in the cable during this process, apparatus of the kind in question has proven to be unsatisfactory. More particularly, unreinforced optical fibre transmission cables are extremely sensitive to stress therein and if laid in a condition where they are subjected to substantial tensile stress the resulting residual strain and consequent static fatigue adversely affect the propagation properties of the cable. Again, of course, there is an increased likelihood of breakage even of less sturdy conventional cables due to occurrence of the aforementioned tensile stress during laying.

An object of the invention is to provide a cable laying apparatus which is capable of laying stress sensitive cables in a way less susceptible of inducing unwanted transient stress into the cable during laying and leaving no residual strain in the cable once layed.

In one aspect, the invention provides cable laying apparatus comprising a mobile carrier movable over a ground surface and operating in use to pay out cable carried by the apparatus so that the cable extends in a run from a supply location for laying as the apparatus moves, the apparatus including drive means for effecting said paying out and control means for controlling said drive means, said control means including sensing means for sensing the amount of cable available in a slack loop formed in the cable run in use of the apparatus, and the control means being effective in use to vary the rate of said paying out of say cable, as effected by said drive mean, whereby to increase said rate of paying out on detection of a decreased amount of cable in said slack loop and to decrease the rate of paying out on detection of an increase in the amount of cable in said slack loop.

Figure 2:
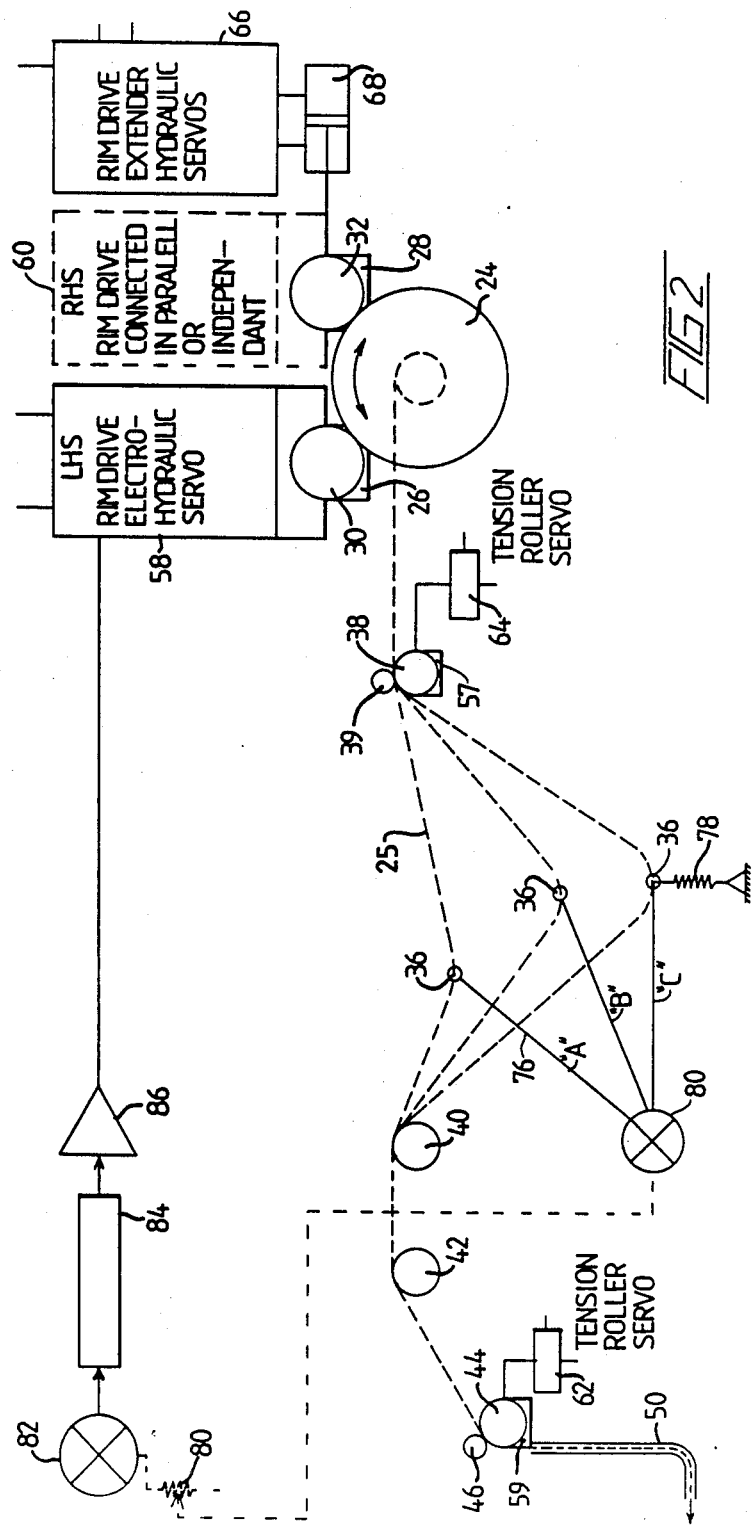

The invention is further described with reference to the accompanying drawings in which:

FIG. 1 is a side view of a cable laying apparatus constructed in accordance with the invention; and FIG. 2 is a diagram illustrating control functions of the apparatus of FIG. 1.

In FIG. 1, an apparatus 10 constructed in accordance with the invention is shown as comprising a carrier 12 which may, as shown, be in the form of a conventional crawler tractor, retaining the forward scraper blade 14 and tracks 16 which are driven to effect movement of the carrier over the ground surface in which the cable is to be laid. As is usual, blade 14 is pivotally interconnected at its lower part to two arms 19, themselves pivotal on the carrier 12.

At a forward end, the carrier 12 has two forwardly and upwardly extending arms 18 which are fixed to the top of blade 14 and which, at the forward ends thereof, are equipped with means for freely rotatably receiving a cable reel 24.

Hydraulic rams 90 interconnect the blade 14 and arms 19 to allow the blade and hence the carrying arms 18 to pivot about the interconnections of the blade 14 with the arms 19, thus facilitating the loading and unloading of cable reels. Two hydraulic motors 26 are provided, each mounted on a respective carriage 70 lengthwise movable on a respective one of the arms 18. Motors 26 are provided with drive wheels (not visible in FIG. 1 but shown diagrammatically by reference numeral 30 in FIG. 2) for engaging and driving the respective rims of the reel 24. Arms 18 house hydraulic cylinders which are actuatable to move the carriages 70 and hydraulic motors 26 lengthwise of the arms 18 to cause to drive wheels 30 to contact the cable reel flanges, and are also actuatable to retract the wheels 30 from the reel rims when driving is not required. These hydraulic cylinders are not shown in FIG. 1, but one such cylinder is shown in FIG. 2 designated by reference numeral 68. Raising of the reel 24 may be effected by operating further hydraulic rams 32 to raise or lower the scraper blade 14.

The cable 25 from reel 24 passes rearwardly therefrom over a tension roller 38 and associated pinch roller 39, thence through a guide 36, thence rearwardly over idler rollers 40, 42 and downwardly between a tension roller 44 and an associated pinch roller 46. Thence, the cable passes downwardly through guides in a cable chute 50 so as to leave the cable chute in a generally horizontal, rearward, direction. The cable chute is provided at the rear of a downwardly depending tyne 56, and both tyne and chute are together vertically movable by operation of a hydraulic ram 55, particularly for raising the tyne clear of the ground for transport.

In operation, the tyne 56 is lowered so that it penetrates the ground surface over which the carrier 12 is moving so as to form a trench for receiving the cable. Pre-ripping is usually carried out to break up the soil and rock to the required depth prior to the cable laying apparatus.

The cable itself is wound off the reel 24 and passes as described to the chute 50 for laying in the trench formed by the tyne 56 or by the tyne together with the described pre-ripping.

Rollers 38 and 44 are driven by hydraulic motors 57, 59 (FIG. 2) with a small fluid pressure supply so as to generate a light driving force on the cable. The main cable reel drive motors 26 are provided with variable pressure hydraulic fluid for driving the wheels 30 and thus the reel 24 also, at varying speed in dependence with the provided pressure. More particularly, FIG. 2 shows an electro-hydraulic servo 58 which controls one motor 26 and its associated wheel 30, and a similar electro-hydraulic servo 60 for driving the other motor 26 and its associated drive wheel 30. Solenoid valves 62, 64 for driving rollers 38, 44 are also shown in FIG. 2, together with a solenoid valve 66 effective to operate hydraulic cylinders 68 for moving the carriages 70 lengthwise of the arms 18.

The carriages 70, in addition to carrying the hydraulic motors, also carry servo valves and associated hydraulic valving (not shown).

By providing a continuous pressure of suitable value to the cylinders 68 and by making use of the valves associated therewith, it may be ensured that the wheels 30 are pressed against the rims of the reel 24 in such a fashion that non concentricity of the rims with respect to the axis of rotation of the reel is accommodated by movement of the motors 26 with the carriages 70 lengthwise of the arms 18.

The guide 36 through which the cable 25 passes may be in the form of a loop, roller or curved guide and is attached to the free end of an arm 76 which is pivotally secured at a rear end thereof to the carrier 12, for swinging movement in a vertical plane about a horizontal axis. The pivot point of arm 76 is located rearwardly with respect of the location of the guide 36, and the arm 76 extends somewhat horizontally forwardly from the pivot location to its free end at which the guide 36 is positioned. It will be observed, from FIG. 2 for example, that the guide 36 is itself positioned between the relatively forward location of the roller 38 and the relatively more rearward location of the idler roller 40 over which the cable passes.

In use, the roller 38 is driven to engage and drive the cable 25 at a location slightly rearward of the reel 24. This light driving is so effected as to ensure that cable 25 is fed directly from reel 24 into guide 36 without forming any substantial slack.

The cable outfed from reel 24 develops, in the cable run between the roller 38 and the roller 40, a catenery-shaped slack loop 25a. This is so located that the lower portion thereof is positioned in the guide 36.

A spring 78 is secured to the free end of arm 76 so as to extend downwardly therefrom to a fixed location on the carrier 12. The spring 78 is a tension spring and is effective to lightly bias the free end of the arm 76 downwardly. Such downward bias is, however slight and is resisted by the cable itself where the cable passes through the guide 36. Practically speaking, then, the arm 76 will in use adopt a pivotal position determined substantially solely by the amount of cable in the slack loop 25a, more particularly by the vertical position of the lower part of this loop where the element 36 engages the loop.

The amount of cable in the slack loop 25a, and thus the vertical positioning of the lower portion of the loop, is however, dependent upon various factors, particularly the rate of change of paying out of cable from the reel 24. If, by way of example, reel 24 were held rigidly so that no cable were paid out, the amount of cable in the slack loop will decrease as the carrier 12 is driven, bearing in mind that the rear end of the cable already laid in the trench made by the apparatus will be held substantially immobile by frictional forces between the soil and the cable sheath. On the other hand, if the drive to the reel 24 were to be at such a rate as to pay out cable at a significantly greater rate than it is being laid into the trench, then the amount of cable in the slack loop will increase. Generally, it is desirable to include in the apparatus means sensitive to excessive tension changes induced in the cable by an electrical or mechanical malfunction or operator error, for example operating to react just prior to the onset of inducement of stress forces into the cable to automatically stop the apparatus to prevent further laying, and to similarly automatically stop under the condition where an excess of cable is formed in the slack loop through some malfunction or operator error.

In FIG. 2, three positions of the arm 76 are shown. One position, marked "A", prevails where there is little deflection of the cable as it passes from roller 38 to roller 40, and prevails where there is only a small amount of cable in loop 25a. Another position marked "C" prevails where the cable is quite slack, such that the spring 78 biases the arm so as to rotate it clockwise as viewed in the drawings from the position "A". Also as shown, the arm 76 can adopt a third, intermediate position "B" between these two positions "A" and "C". It will be observed, therefore, that the arm 76 is rotated in dependence with the change of vertical position of the lower extremity of slack loop 25a, which vertical position rises when the amount of cable in the slack loop 25a is reduced and falls when the amount of cable in the slack loop 25a is increased.

Referring particularly to FIG. 2, now, a potentiometer 80 is shown having its movable contact connected to be rotated by arm 76 so that the resistance of the potentiometer presented between the movable contact and one end thereof varies in dependence with the extent of rotational movement of the arm 76. Potentiometer 80 is connected to an error amplifier 82 which is effective to detect positive or negative changes in the resistance of the potentiometer 80, caused by departures from a predetermined desired cable position corresponding to the position at which the arm 76 is at its position "B". Signal from the amplifier 82 is passed to a proportional controller device 84, and through a power amplifier 86 to generate an electrical signal which is applied to the servo 58 and servo 60 in order to vary the speed and direction of rotation of the wheels 30 and thus to vary the speed of rotation of the reel 24 and the rate of paying out of cable thereof. This applied signal may be an analogue signal of polarity determined by whether arm 76 is moved from position "B" towards position "A" or towards position "C", and of magnitude proportional to the extent of movement away from position "B". This variation in the rate of paying out also effects corresponding variation in the amount of material in the slack loop 25(a) of the cable. The arrangement is such that, on decrease of the amount of cable in the slack loop 25a, (that is to say by movement of the O arm 76 towards the position "A") the proportional controller 84 provides a signal through amplifier 86 effective to increase the hydraulic fluid flow to the hydraulic motors driving wheels 30 whereby to increase the speed of rotation of the drum, thereby acting to increase the amount of cable in the slack loop and tending to restore the arm 76 to its position "B". Conversely, in the case where the cable slack loop drops and the arm 76 moves to the lower position "C" shown, the controller 84 applies a signal via amplifier 86 to servos 58 and 60 which is effective to decrease the speed of rotation of reel 24, thereby decreasing the amount of cable in the slack loop and again tending to restore the arm 76 to its position "B".

Although not shown, a manual override control is normally provided to permit manual variation of the speed of rotation of reel 24 for the purposes of reel set up or reel changing.

The described arrangement has been found to be particularly satisfactory in the described application for laying unreinforced optical fibre cables with minimal tensile stress capacity. The apparatus has also been used for laying othertypes of cable with similar success.

The described arrangement permits laying of the cable 25 with substantially no tension therein. This action is aided by the two sets of tension rollers 38, 44 and the associated pinch rollers 39, 46. Roller 38 ensures that no drooping slack of cable forms under reel 24. This is, cable leaves the reel 24 and passes directly to slack loop 25a. The tension roller 44 and pinch roller 46 are effective in applying a light "assist" force to cable 25 which balances any small tensions possibly accumulated in cable 25 as it passes through guide 36 in loop 25a and/or over idler rollers 40 and 42.

Further, rollers 44 and 46 ensure that any frictional forces accrued in passage through chute 50 are also compensated for or balanced.

Cable thus exits chute 50 into the prepared trench with practically negligible tension therein.

The described arrangement has been advanced merely by way of explanation and many modifications may be made thereto without departing from the spirit and scope of the invention as defined in the appended claims.

I claim:

1. Cable laying apparatus comprising:
   a mobile carrier movable over a ground surface and operable to pay out cable carried by the apparatus so that the cable extends in a run from a supply location for laying as the apparatus moves;
   drive means for effecting said paying out;
   control means for controlling said drive means, said control means including sensing means for sensing the amount of cable present in a slack loop formed in the cable run, and the control means being effective to vary the rate of said paying out of said cable, as effected by said drive means, whereby to increase said rate of paying out on detection of a decreased amount of cable in said slack loop and to decrease the rate of paying out on detection of an increase in the amount of cable in said slack loop; and
   first and second tension rollers with respective adjacent first and second pinch rollers, the tension rollers being spaced apart along said cable run and arranged whereby the cable passes lengthwise between and is engaged by each tension roller and its adjacent pinch roller, the slack loop being formed between the tension rollers and said drive means being effective to drive said tension rollers to drivingly engage the said cable to substantially remove tension in the cable.

2. Cable laying apparatus as claimed in claim 1 wherein the apparatus further comprises means for receiving reel of said cable at said supply location and the drive means is effective to rotate the cable reel to effect said paying out.

3. Cable laying apparatus as claimed in claim 2 wherein the sensing means includes an element which is movable in dependence with variations in deflection at a sensing location in said slack loop occurring when the amount of cable in the slack loop varies, and indication means effective to provide an indication of the extent of said deflection.

4. Cable laying apparatus according to claim 3, wherein said indication means comprises an arm which is pivoted at a location towards one end thereof and having, spaced from that location, means for engaging said cable in said slack loop, at said sensing location, and the sensing means being sensitive to the extent of rotation of the arm about the location at which it is pivoted.

5. Cable laying apparatus as claimed in claim 4, arranged whereby, said slack loop is formed as a catenary extending between spaced locations and said sensing location is at a lower extremity thereof, said arm being resiliently downwardly biased by resilient biasing means.

6. Cable laying apparatus as claimed in claim 1 wherein said carrier includes means for forming a trench in said ground surface, and directing means for directing the cable thereinto.

7. Cable laying apparatus as claimed in claim 6 wherein a second pinch roller is positioned adjacent to and above said directing means.

* * * * *